United States Patent
Tringale et al.

(10) Patent No.: US 9,753,822 B1
(45) Date of Patent: Sep. 5, 2017

(54) AUTOMATIC NON-DISRUPTIVE CONNECTION RECOVERY OF A FIXED TOPOLOGY FABRIC IN A DATA STORAGE SYSTEM

(71) Applicant: EMC CORPORATION, Hopkinton, MA (US)

(72) Inventors: Alesia Tringale, Worchester, MA (US); Sean Pollard, Methuen, MA (US); Julie Zhivich, Westborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 107 days.

(21) Appl. No.: 14/808,369

(22) Filed: Jul. 24, 2015

(51) Int. Cl.
| | | |
|---|---|---|
| *G06F 11/00* | (2006.01) | |
| *G06F 11/20* | (2006.01) | |
| *G06F 11/07* | (2006.01) | |
| *G06F 11/14* | (2006.01) | |

(52) U.S. Cl.
CPC ........ *G06F 11/203* (2013.01); *G06F 11/0727* (2013.01); *G06F 11/1423* (2013.01); *G06F 11/2002* (2013.01); *G06F 2201/805* (2013.01)

(58) Field of Classification Search
CPC .............. G06F 11/203; G06F 11/0709; G06F 11/0727; G06F 11/0745; G06F 11/0793; G06F 11/1423; G06F 11/1425; G06F 11/1616; G06F 11/2002; G06F 11/2017; G06F 11/2023; G06F 11/2033; G06F 11/2046; G06F 2201/805
USPC ....... 714/4.2, 4.11, 4.21, 4.3, 5.11, 6.21, 42, 714/43, 56
See application file for complete search history.

(56) References Cited

U.S. PATENT DOCUMENTS

| | | | | |
|---|---|---|---|---|
| 2015/0046745 A1* | 2/2015 | Dhavale | ............... | G06F 3/0647 714/4.11 |
| 2016/0132411 A1* | 5/2016 | Jolad | .................. | G06F 11/2007 714/6.3 |
| 2016/0140003 A1* | 5/2016 | Panara | ............... | G06F 11/2017 714/6.21 |

* cited by examiner

Primary Examiner — Joseph D Manoskey
(74) Attorney, Agent, or Firm — Anderson Gorecki LLP (57) ABSTRACT

Individual transport connections within a dual-star fabric connected multi-node storage system are disabled in response to associated failures due to faulty hardware or temporal congestion. Each configured IB transport connection is monitored for viability and, upon failure, removed from the pool of available resource. Following failure restoration the resource is tested to ensure proper functionality and then restored to the pool of resources. Mappings associated with the transport connections are maintained while the connections are disabled.

20 Claims, 11 Drawing Sheets

QP Mappings 400

$QP^0_{1-2}$    Addr/pntr   LID $QP^1_{1-2}$    Addr/pntr   LID $QP^0_{1-3}$    Addr/pntr   LID $QP^1_{1-3}$    Addr/pntr   LID

. . .

$QP^0_{3-1}$    Addr/pntr   LID $QP^1_{3-1}$    Addr/pntr   LID

. . .

$QP^0_{4-1}$    Addr/pntr   LID $QP^1_{4-1}$    Addr/pntr   LID

AUTOMATIC NON-DISRUPTIVE CONNECTION RECOVERY OF A FIXED TOPOLOGY FABRIC IN A DATA STORAGE SYSTEM

BACKGROUND

Aspects of this disclosure are generally related to data storage systems which can be used to maintain relatively large data sets and support a relatively large number of concurrent users. The basic building blocks of a scalable data storage system may include storage engines or storage servers. A plurality of storage engines or storage servers are interconnected in order to function together as a storage array or storage server cluster. Additional storage engines or servers may be added to increase capabilities of the data storage system. Each storage array or storage server cluster typically includes multiple physical storage devices which are used to present logical storage devices to instances of applications running on host devices. A wide variety of technologies can be used to interconnect storage engines and storage servers, including but not limited to Infiniband, PCI-X, Fibre Channel, Gigabit Ethernet, and various proprietary technologies.

SUMMARY

All examples, aspects and features mentioned in this document can be combined in any technically possible way.

In accordance with an aspect, an apparatus comprises: a data storage system comprising: a plurality of data storage devices; a plurality of storage nodes configured to access the data storage devices and communicate with another device; and a first switch and a second switch, each of which interconnects each pair of the storage nodes via at least one point-to-point link such that there are at least two point-to-point links between each pair of storage nodes; wherein each storage node includes at least one memory component and is configured to utilize the point-to-point links to access memory components associated with other storage nodes of the plurality of storage nodes, and in response to detection of a failure condition to route all communications associated with accessing memory components associated with other storage nodes of the plurality of storage nodes through the second switch while maintaining mapping information associated with all of the point-to-point links through the first switch. In some implementations at least one queue pair is associated with each storage node pair and the apparatus further comprises a channel adapter that maintains a pool of queue pairs including the mapping information. In some implementations each storage node is configured to disable a queue pair associated with a transport error. In some implementations each storage node is configured to disable a queue pair associated with an asynchronous event. In some implementations in response to detection of the failure condition a send side storage node of a storage node pair sends a connection request to a receive side storage node of the storage node pair, and the receive side storage node responds by sending a connection reply to the send side storage node. In some implementations the send side storage node and the receive side storage node exchange packets indicating readiness of the queue pair. In some implementations the send side storage node sends a test packet to the receive side storage node using the queue pair. In some implementations each storage node is configured to sequentially enable disabled queue pairs in response to the indication of failure restoration. In some implementations each storage node is configured to delay, in response to an indication of failure restoration, enabling queue pairs disabled due to a failure. In some implementations each storage node is configured to send a failure notification to other storage nodes in response to detection of a transport error or asynchronous event.

In accordance with an aspect, a method comprises: in a data storage system comprising a plurality of data storage devices, a plurality of storage nodes configured to access the data storage devices and communicate with another device, and a first switch and a second switch, each of which interconnects each pair of the storage nodes via at least one point-to-point link such that there are at least two point-to-point links between each pair of storage nodes: utilizing, by each storage node, the point-to-point links to access memory components associated with other storage nodes of the plurality of storage nodes; and in response to detection of a failure condition, routing all communications associated with accessing memory components associated with other storage nodes of the plurality of storage nodes through the second switch while maintaining mapping information associated with all of the point-to-point links through the first switch. In some implementations at least one queue pair is associated with each storage node pair and the method comprises maintaining, by a channel adapter, a pool of queue pairs including the mapping information. In some implementations the method comprises disabling a queue pair associated with a transport error. In some implementations the method comprises disabling a queue pair associated with an asynchronous event. In some implementations the method comprises, in response to detection of the failure condition, a send side storage node of a storage node pair sending a connection request to a receive side storage node of the storage node pair, and the receive side storage node responding by sending a connection reply to the send side storage node. In some implementations the method comprises the send side storage node and the receive side storage node exchanging packets indicating readiness of the queue pair. In some implementations the method comprises the send side storage node sending a test packet to the receive side storage node using the queue pair. In some implementations the method comprises each storage node sequentially enabling disabled queue pairs in response to the indication of failure restoration. In some implementations the method comprises each storage node delaying, in response to an indication of failure restoration, enabling queue pairs disabled due to a failure. In some implementations the method comprises each storage node sending a failure notification to other storage nodes in response to detection of a transport error or asynchronous event.

DETAILED DESCRIPTION

Figure 1:
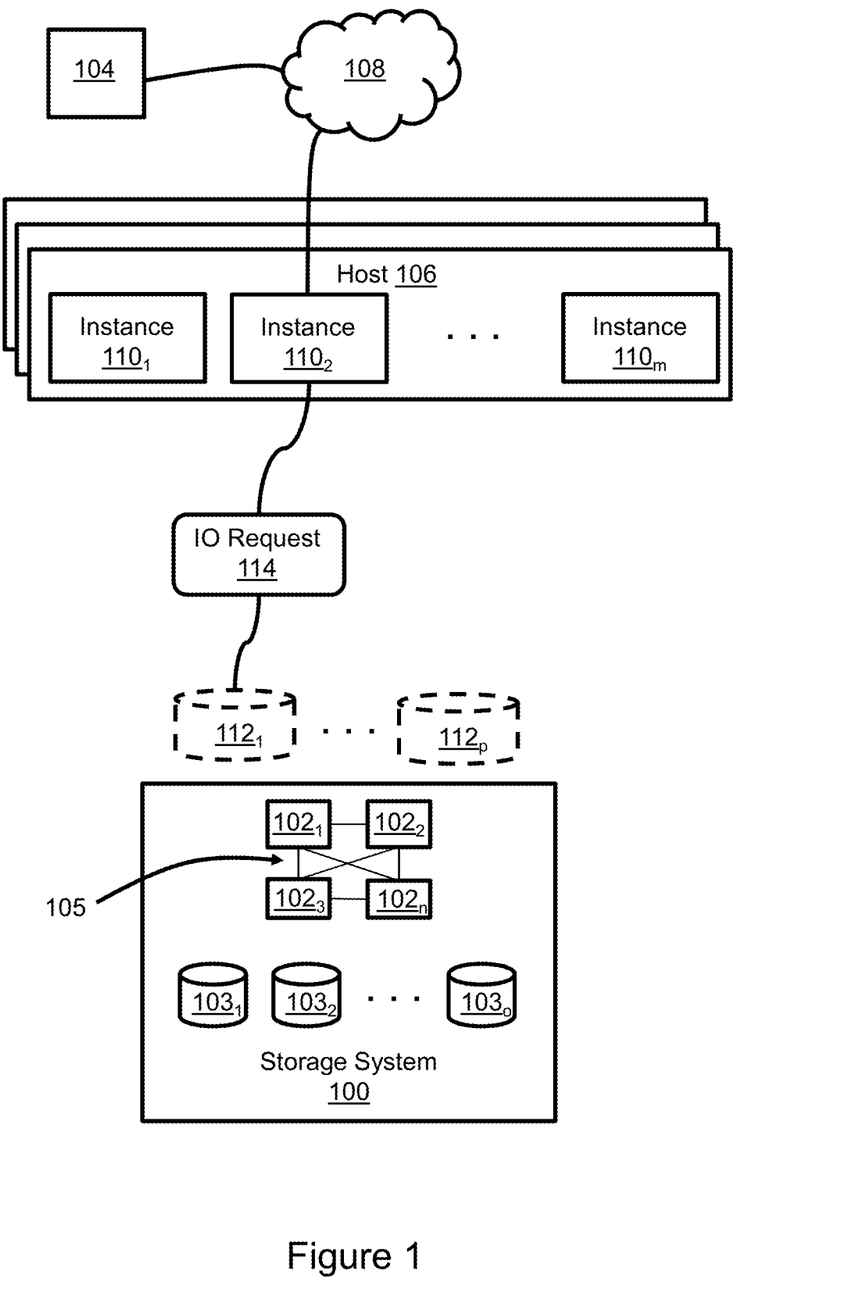
FIG. 1 illustrates a scalable data storage system in a network environment.

FIG. 1 illustrates a data storage system 100 that maintains data and supports IOs associated with a large number of concurrent users. The data storage system includes multiple storage nodes $102_1$-$102_n$ and multiple data storage devices $103_1$-$103_o$ which are physical components and provide non-transitory storage. The system can be scaled by changing the number of storage nodes and data storage devices. Each storage node is connected to every other storage node via an interconnecting fabric 105, e.g., in a dual star configuration including separate point-to-point links for each connection between pairs of storage nodes. Moreover, each printed circuit board "blade" in the system may be interconnected via the fabric. The point-to-point links provide high speed communications and may support operations such as RDMA (Remote Direct Memory Access). The interconnection of the storage nodes and RDMA capability enable the storage nodes to function together as a single device in some respects as will be explained in greater detail below. Those skilled in the art will appreciate that the storage nodes $102_1$-$102_n$ could include storage engines, storage servers, or other devices. The storage devices $103_1$-$103_o$ may include pools of different types of devices which are organized into hierarchical tiers. For example and without limitation, the storage devices may include a storage pool of flash drives at tier 0, a storage pool 132 of FC (Fibre Channel) drives at tier 1, and a storage pool 134 of SATA (serial advanced technology attachment) drives at tier 2.

An exemplary computing device 104 such as a user terminal or server uses the data storage system 100 by communicating with a host device 106 via a network 108. Many computing devices may utilize the data storage system concurrently but only one computing device 104 is illustrated for clarity. Multiple host devices 106 may be associated with the storage system 100, and each host device may host any of a wide variety of applications. An exemplary host device may be a type of server which hosts one or more instances $110_{1-m}$ of an application such as a database, for example and without limitation, for which the corresponding data is maintained by the data storage system 100. The data storage system 100 may create logical storage devices $112_1$-$112_p$ for presentation to the host device, although a system admin might create the logical storage devices for any of a variety of purposes. The logical storage devices, which may be referred to as or by LUNs (logical unit numbers) or meta-volumes, may be presented to the host as a set of contiguous address locations. The application and the host device will typically be unaware of the actual location of data on the physical storage devices. A communication between the computing device 104 and an instance of an application running on the host 106 may prompt data access. A corresponding JO request 114 sent to the storage system 100 by the application instance $110_2$ in order to read or write data will reference a location in a particular logical storage device, e.g., logical storage device $112_1$. The storage nodes $102_1$-$102_n$ maintain a mapping between the logical storage devices $112_1$-$112_p$ and the physical storage devices $103_1$-$103_o$. The data stored on each logical storage device may be distributed across multiple physical storage devices, and extents of data may be moved between physical storage devices in response to tiering decisions and other factors. Any of the storage nodes $102_1$-$102_n$ can receive and process the JO request 114, e.g., by writing data to the physical storage devices or reading data from the physical storage devices and sending the data to the host. Consequently, the storage nodes share loading, and the failure of a storage node does not prevent a host device from accessing the storage system.

Figure 2:
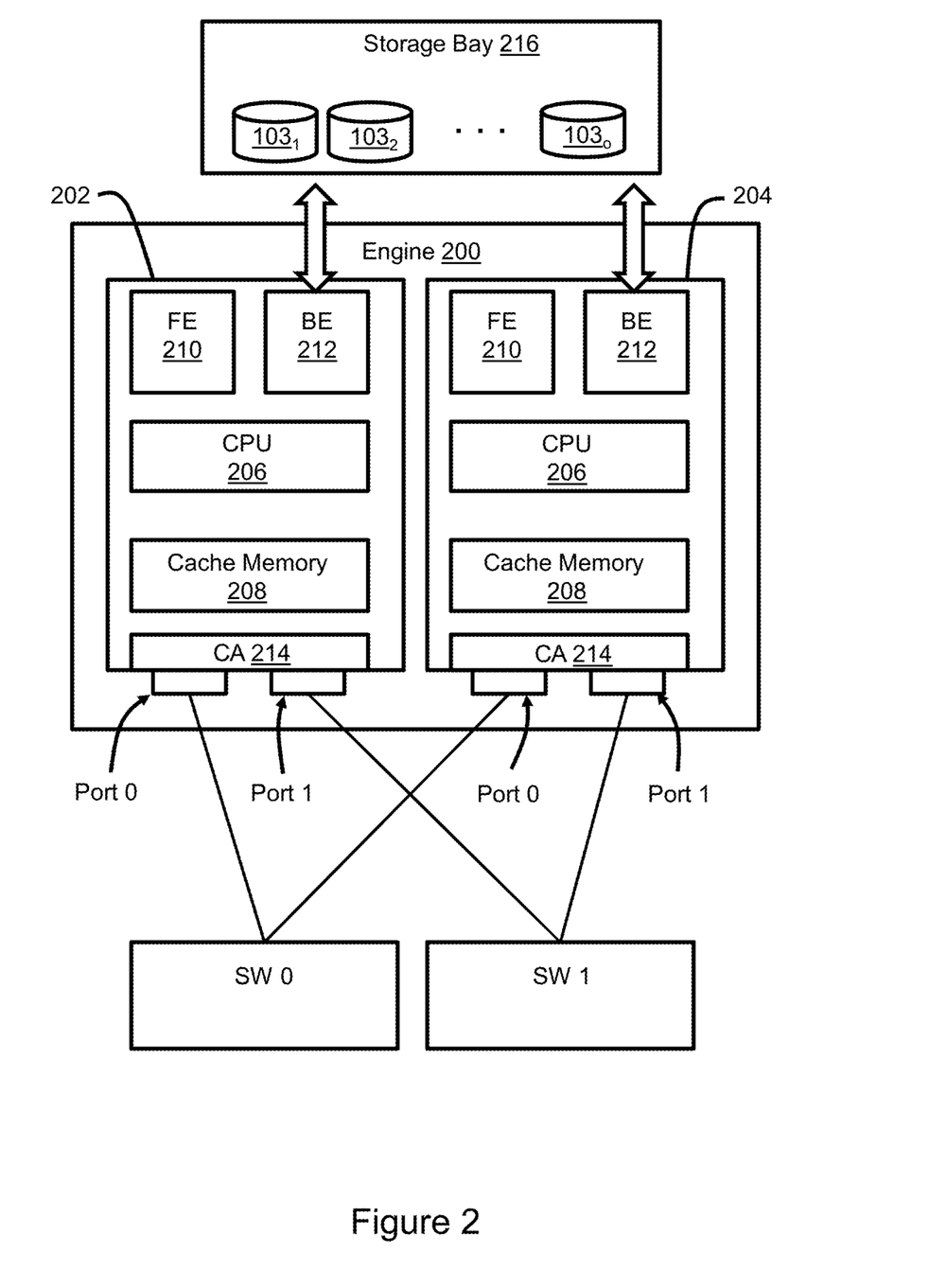
FIG. 2 illustrates an implementation of a storage node of the data storage system in greater detail.

FIG. 2 illustrates an implementation of a storage node $102_n$ (FIG. 1) in greater detail. In the illustrated example the storage node is a storage engine 200 which includes two storage directors 202, 204. Each storage director includes a multi-core CPU 206, a cache memory 208, a front end module 210, and back end module 212, and a channel adapter 214, all of which may be on a single printed circuit board blade. The front end module 210 is configured to interface with the host devices 106 (FIG. 1). For example, the front end module presents the logical storage devices, receives JO requests from host application instances, and provides data in response to read requests. The back end module 212 interfaces with a storage bay 216 which contains the back end physical storage devices $103_1$-$103_o$. For example, the back end module reads data from and writes data to the back end storage devices. The CPU 206 runs a variety of programs configured to cause the director to perform IOs and other functions. The cache memory 208, which may include volatile memory components such as RAM (random access memory) chips for example and without limitation, includes a section which is allocated for temporarily storing data that is being written to or read from the back end storage devices. For example, data that is being written by a host device is initially copied to the cache and subsequently destaged to the back end storage devices. Data that is being read by a host device is copied from the back end storage devices to cache and then provided to the host via the back-end module. Data may be also copied to the cache from the back end storage devices in response to a hint. When data corresponding to an JO request is already in the cache, i.e., a "cache hit," then that cached copy of the data can be used to service the JO request without accessing back end storage. When the data being accessed is not already in the cache, i.e. a "cache miss," then that data must be copied into the cache in order to service the JO request, e.g., copied into cache from back end storage in response to a read request. Generally, any data that has not been accessed recently or within a predetermined period of time may be flushed from the cache and written to the back end storage devices. The storage directors 202, 204 may operate in parallel such that IO requests are concurrently serviced and the failure of one director does not cause the failure of other directors.

Referring to FIGS. 1 and 2, the section of the cache 208 of each director that is used to temporarily store selected data as described above is shared globally within the data storage system 100. More particularly, any director in the data storage system can write to and read from the cache of the other directors in the data storage system. Consequently, if a director associated with storage node $102_1$ receives a request to access data that is in the cache of a director associated with storage node $102_3$ it is considered as a cache hit. The director associated with storage node $102_1$ accesses the data from the cache of the director associated with storage node $102_3$ and, for example, provides the data to the host via the front end module or writes to the cache of the director associated with storage node $102_3$.

Figure 3:
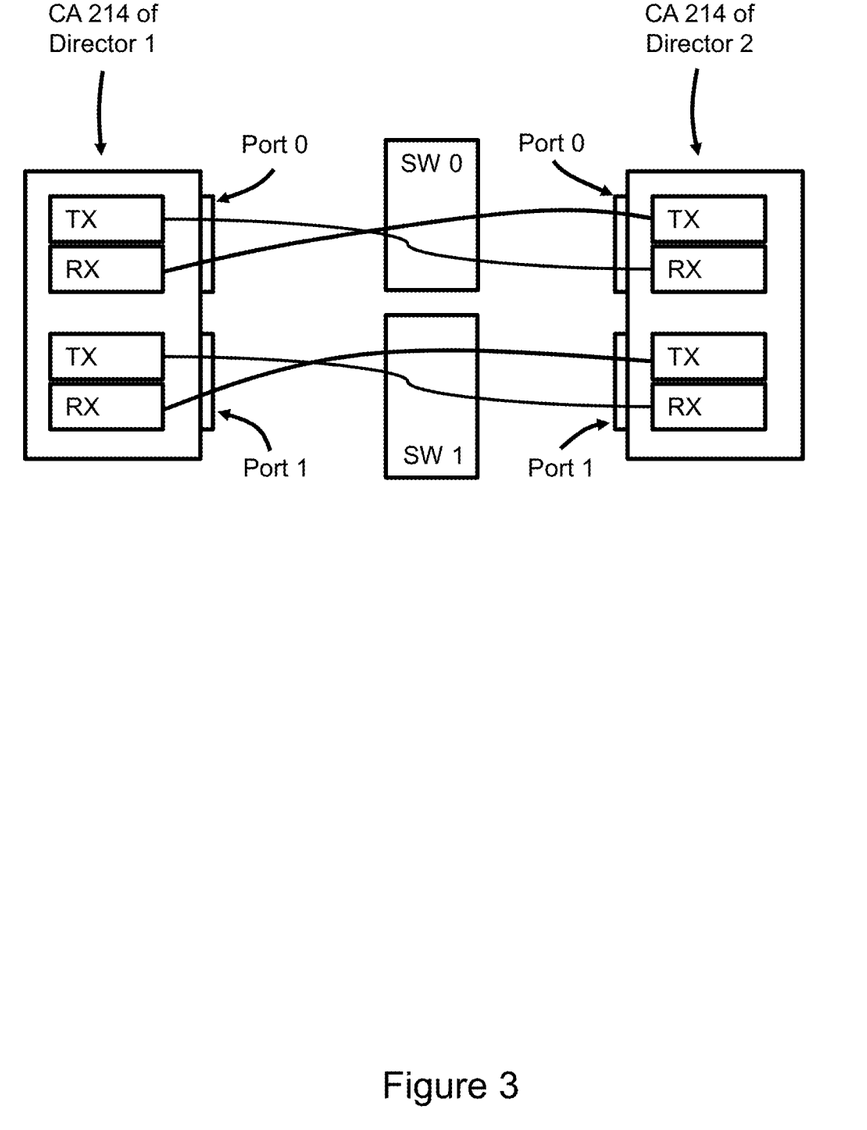
FIG. 3 illustrates interconnection of storage nodes via channel adapters in greater detail.
Figure 4:
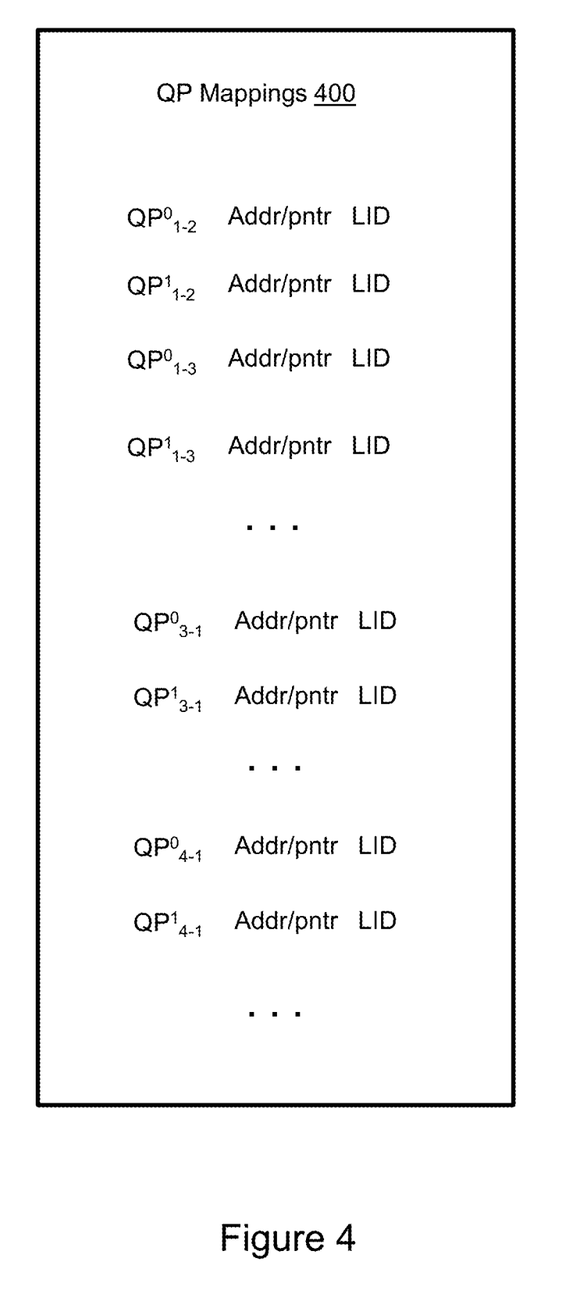
FIG. 4 illustrates aspects of queue pair mappings.

Referring to FIGS. 2 through 4, the channel adapters 214 and switches SW0, SW1 of the dual-star fabric are configured to enable the storage engines to access the cache of other storage engines so that cache memory is available as a globally shared resource. IB (Infiniband) switches will be described as an implementation, but a wide variety of switches and switching protocols could be used. Each channel adapter 214 includes two ports, Port 0 and Port 1. The two ports correspond to the two switches SW 0, SW 1 of the fabric which provides point-to-point connectivity between directors, e.g. Port 0 corresponding to switch SW 0 and Port 1 corresponding to switch SW 1. Communications via the channel adapters and switches are accomplished by using statically configured QPs (Queue Pairs). For example, $QP^0{}_{1-2}$ provides a point-to-point communication link from a CA (channel adapter) of director "1" to a CA of director "2" via switch SW 0. Each QP includes a source (transmit) queue associated with the source-side director and a corresponding destination (receive) queue associated with the destination-side director. A QP is an addressable entity, and QP mappings 400 which are maintained in a QP pool may include QP identifiers, an address or pointer to a corresponding address space allocated to the queue, and a type of address such as a LID (Local Identifier). A message being sent from director 1 to director 2 is sent to either the corresponding transmit queue $QP^0{}_{1-2}$ associated with port 0 or the corresponding transmit queue $QP^1{}_{1-2}$ associated with port 1 depending on availability and load balancing, as will be explained in greater detail below. An address or pointer to the queue is obtained from the mapping 400. The message is packetized and the LID is appended to the message as a header. The switch associated with the port routes the packetized message to the corresponding receive queue based on the LID. The message is then processed at the receiving director channel adapter 214. For example, the message can prompt a RDMA operation such as a read or write from an address range of the cache of the receiving director. The corresponding data is copied from the cache of the receiving director, without use of the CPU, into a transmit queue associated with a QP that connects to the requesting director, e.g., $QP^0{}_{2-1}$ or $QP^0{}_{2-1}$. The data is packetized and an LID is appended thereto. The corresponding switch uses the LID to route the packet to the CA of the requesting director. QPs would be added or removed if corresponding engines were added or removed, but are otherwise static in the sense that the mappings persist even if the corresponding queues are empty or components fail.

Figure 5:
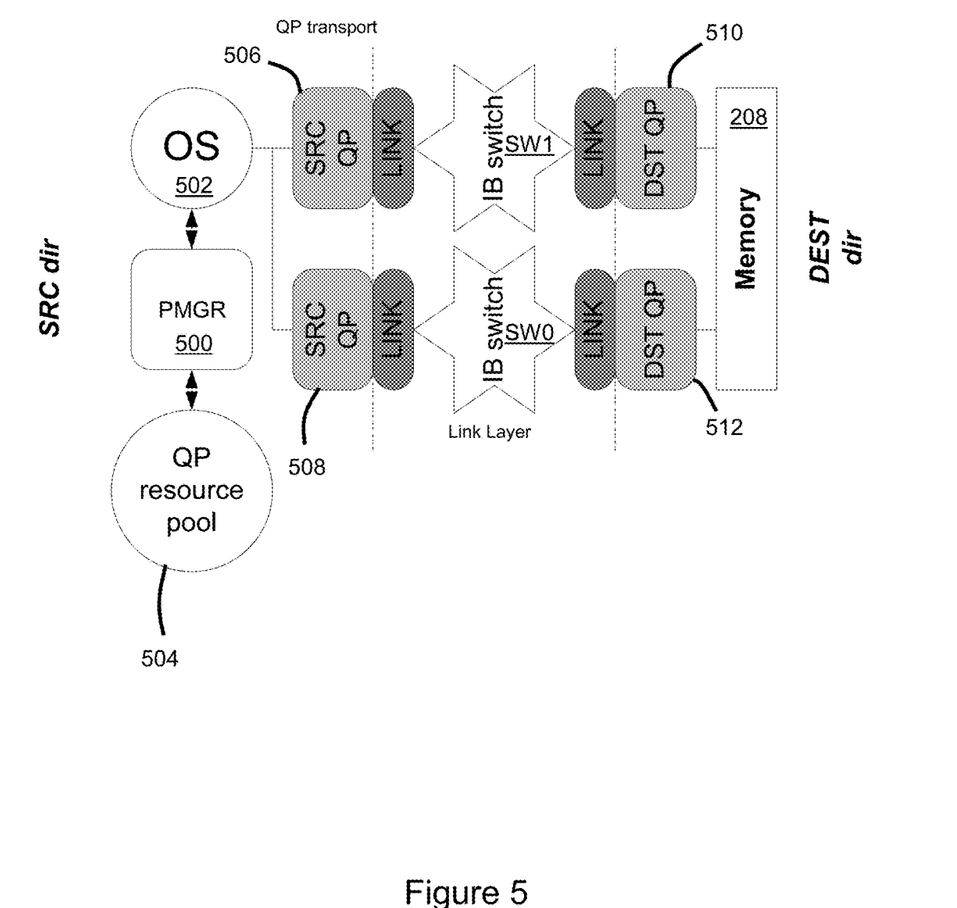
FIG. 5 illustrates aspects of the relationship between source directors and destination directors.

Referring to FIG. 5, each director is a potential QP source for other destination directors, and also a potential destination director for other source directors. Each director includes a path manager module 500 which operates with the OS (Operating System) 502 and QP resource pool 504 of that director. Functions performed by the path manager module 500 may include path/QP selection and adjustment, load balancing/resource management, automatic path recovery, and asynchronous event handling. For example, the path management module tracks path state from QP sources 506, 508 to routed QP destinations 510, 512 and provides the information needed to send traffic to any requested destination node in the storage system. A logical path describes the availability of a fabric resource from one source to a destination, and a physical path, describes the availability of a fabric port or link from a source port to a destination port. The availability of paths depends on the state of the links across the dual-switch fabric as well as the state of the QPs (sometimes referred to herein as resources). If a link or QP is not available, the path manager identifies and selects an alternate link or QP to the destination if one is available.

Figure 6:
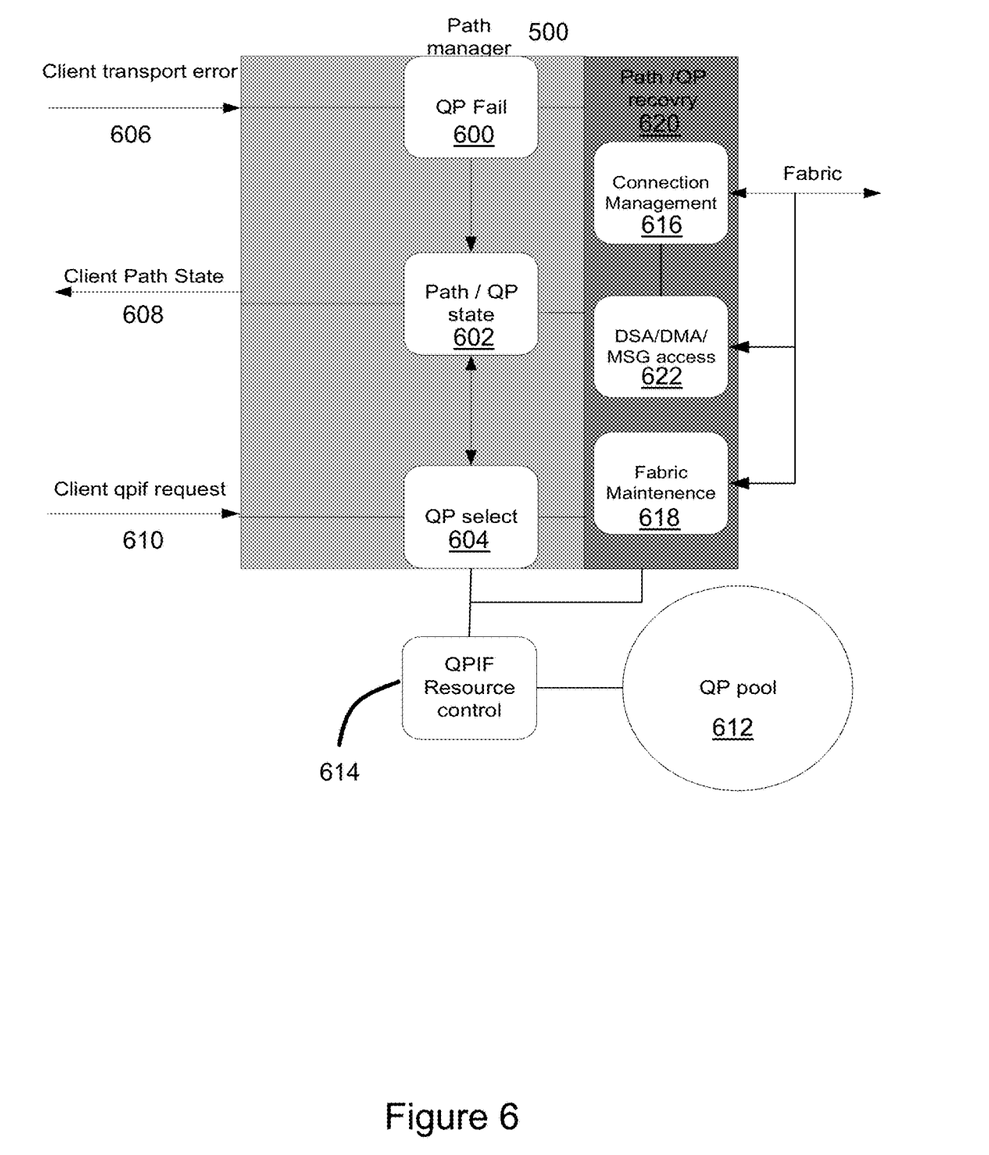
FIG. 6 illustrates the path manager in greater detail.

Referring to FIG. 6, the path manager 500 includes a path/QP recovery manager 620 and three interfaces 600, 602, 604 to each client. Interface 600 is used to signal client transport errors 606 to the path manager. Interface 602 is used to signal client path state 608 relative to a QP. Interface 604 is used for client QPIF requests 610. Each client has a QP pool 612 with mappings of QPs which collectively enable the client to reach every director in the storage system. Logical paths are categorized into three main groups: DSA (direct single access), DMA (direct multi access) and MSG (messages). DSA and DMA are RDMA types and MSG are system messaging types. Under each group is a set of paths associated with each type of IB transport or QP active in the system. The size of each group varies depending on the system QP resource requirements. Under each sub-group, there will normally be at least two QPs (one per switch) attached to every active director in the storage system.

When a path manager client makes a request for a fabric resource, a software interface is returned, e.g. a QPIF (queue pair interface), in response to a client QPIF request 610, QPIF resource controller 614 selects a QP from the QP pool 612. The QPIF request 610 may indicate a quality of service associated with a transaction type, e.g. High, Medium or Low. The QPIF resource controller selects a corresponding QP from the pool based on the indicated quality of service. The selected QP is returned to the requestor and then used for executing the transaction. If a corresponding QP is not available from the pool then a "no path available" reply is returned to the client. Once the client has a valid QPIF, a transport request will be sent to the destination director and the transport will occur. Transport results are validated. If an error is detected during transport validation then a client transport error 606 is provided to the path manager 500.

The QPIF resource controller may implement load balancing. For example, the QPIF returned in response to client QPIF requests may be auto rotated across both ports/switches. Balancing the loading of the two switches may enhance overall performance.

The QPIF resource controller 614 is configured to pull the associated QP out of the QP pool 612 in response to the client transport error 606. Once the QP is pulled from the pool 612, i.e. the path is logically disabled, that QP will no longer be available until the connection manager 616 logic restores that QP and adds that QP back to the pool again. As indicated above, logical paths are categorized into three main groups, DSA, DMA and MESSAGE, and under each group is a set of paths associated with each type of IB transport or QP active in the system. An access module 622 helps to determine which group is having problems with transport errors.

Path recovery is invoked whenever a transport error 606 or asynchronous event causes path/QP state change. Asynchronous events are unexpected during normal system operation, and the only ones that require logical path adjustment are the physical port up and down events. The connection manager 616 uses a protocol that repairs both ends of the disabled QP and tests the QP before returning it to the pool and making it available to the client. The path manager continuously monitors the health of the fabric by using fabric maintenance module 618 packets to determine if the physical connection is good. A recovery thread attached to the path manager 620 monitors logical path state representing the current state of the fabric and QPs attached to that fabric.

Figure 7:
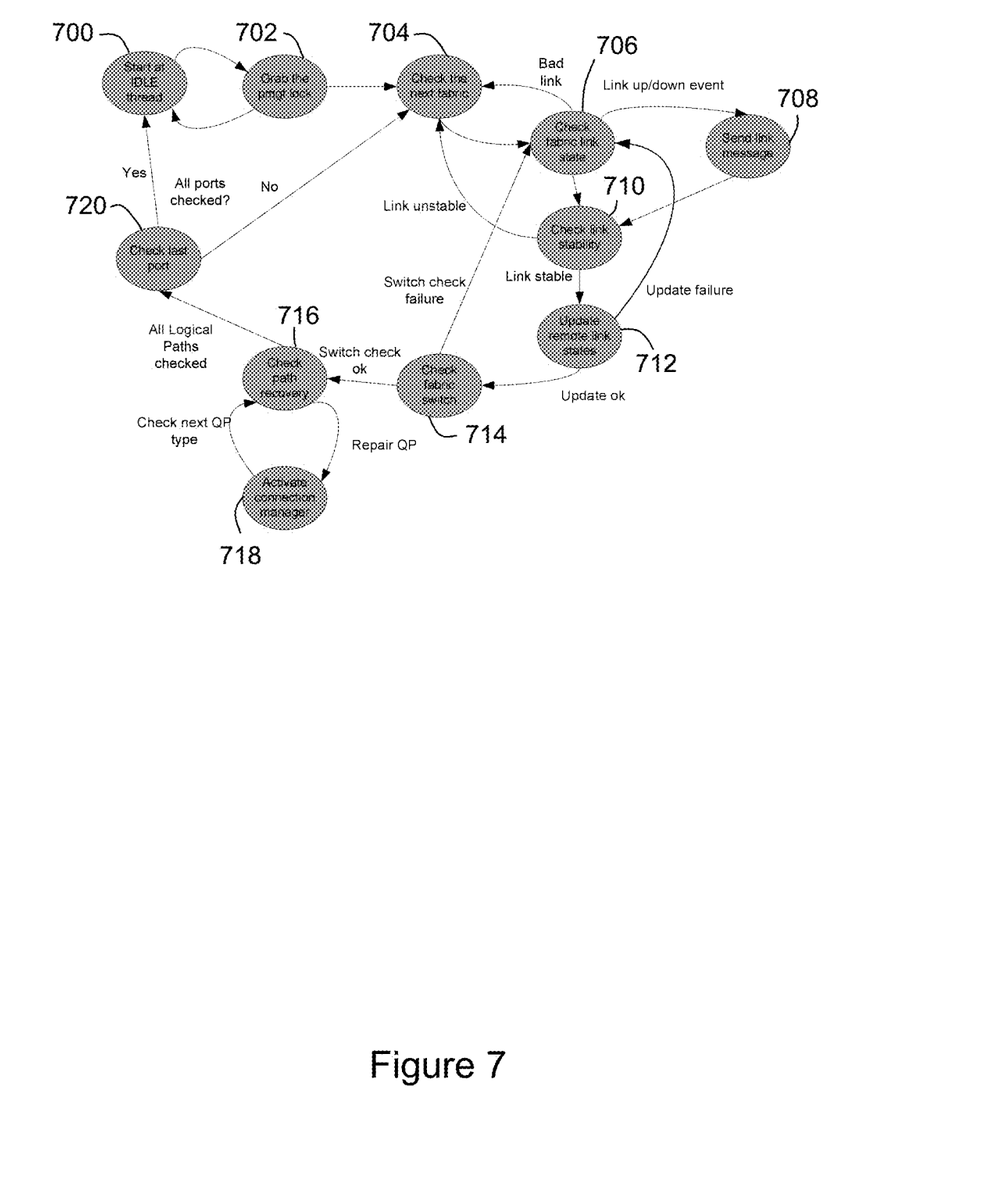
FIG. 7 illustrates a path recovery state machine.

Referring to FIG. 7, path recovery is handled by an internal path manager state machine driven by the recovery thread. All clients of the path manager are given a transaction type identifier that controls the logical path associated with the client resources. The client is responsible for transactional path adjustments and the path manager is responsible for asynchronous system event path adjustments for all clients and all link and QP recovery steps that make the resources available to the clients after any failure event. Starting at an IDLE state 700, the path manager uses a lock as indicated at state 702 to determine which CPU owns the recovery process. There are two redundant fabrics in the system, each of which is checked separately as indicated at 704. Checking the fabrics includes checking the fabric link state at 706, i.e., probing the health of the physical connections within the fabric to determine whether the state of those connections is up or down. The current link state and QP transport state, both of which are tracked by the path manager, can be affected by transaction-based or asynchronous system events. Once a physical link up/down event is detected, a message is sent to all fabric destinations as indicated at 708 so logical paths will be adjusted. In the case of a link down event, the paths are turned off. In the case of a link up event, the paths are untouched and will be turned back on once the resources related to that link are recovered, i.e. ready to be used again and returned to the available pool. Once all the physical connections have been checked in the fabric and determined to be operational they are tested for stability as indicated at 710. If the link is stable, i.e. not bouncing, then remote link states are updated at 712 and if the update is accomplished then the fabric switch is checked at 714 (else back to 706 in the case of an update failure). If the switch check is successful then recovery of transport resources is initiated at 716. The connection manager is activated at 718 and QPs are repaired in order by type. When all logical paths have been checked then flow returns to the idle state if all ports have been checked and the next fabric is selected if all ports have not been checked as determined at 720.

Figure 8:
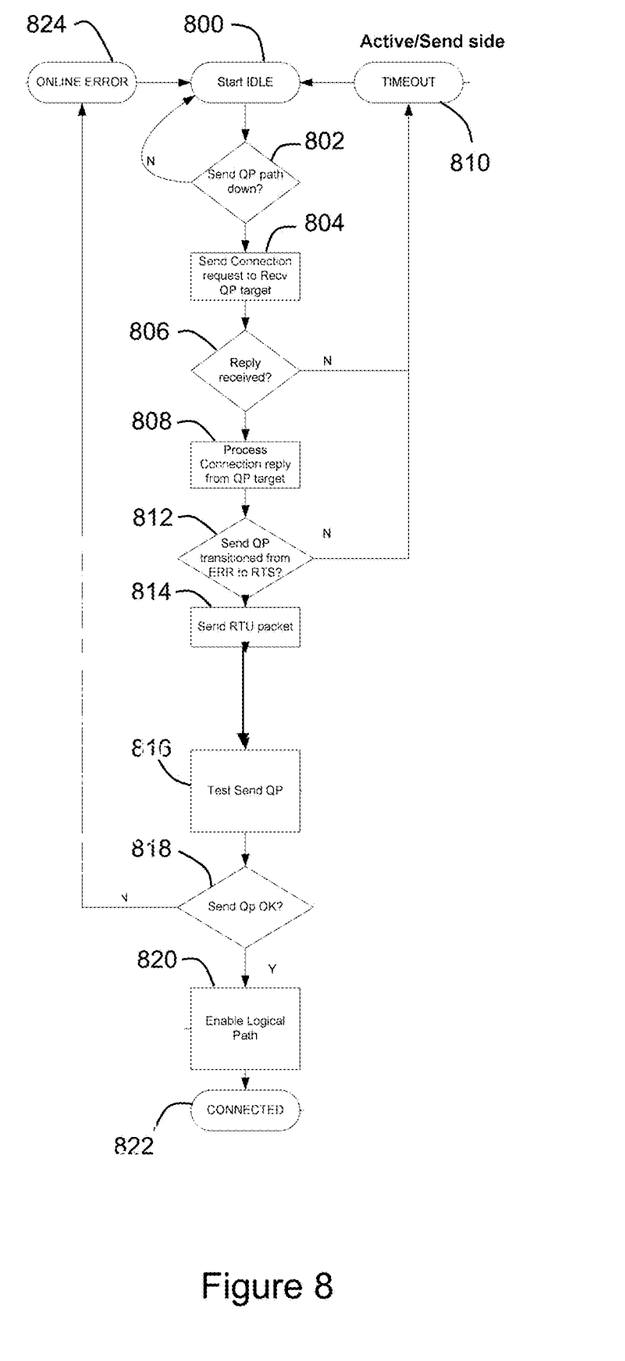
FIG. 8 illustrates aspects of active/send side QP restoration.
Figure 9:
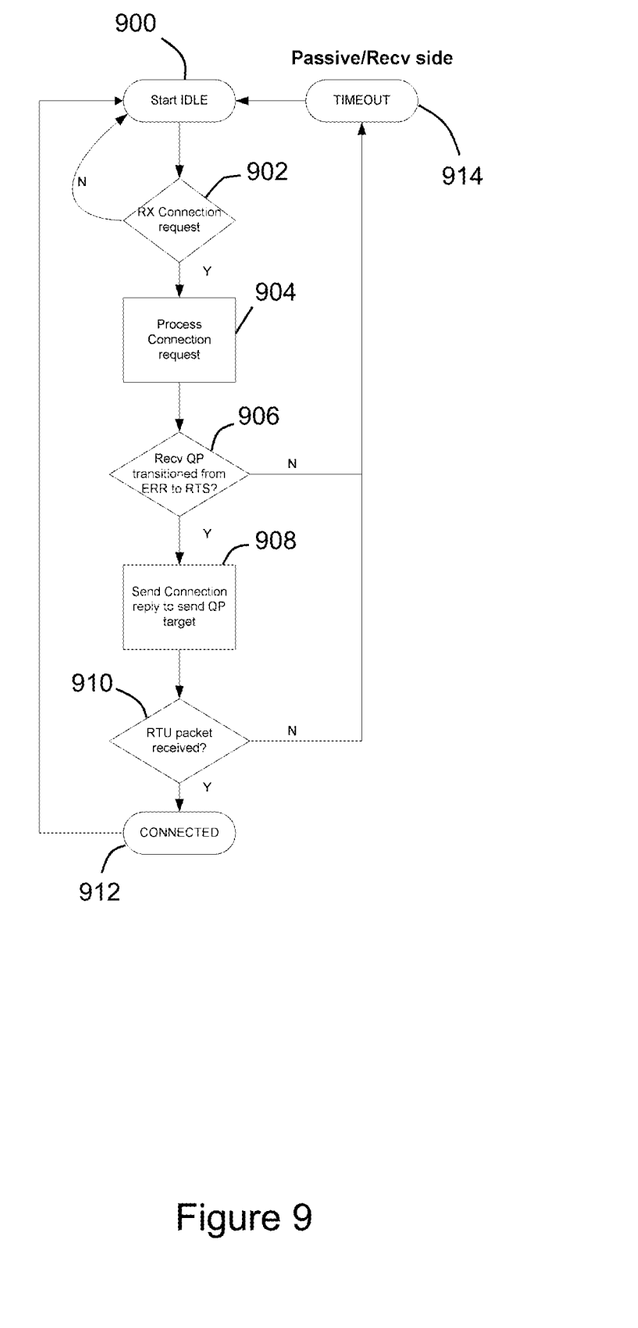
FIG. 9 illustrates aspects of passive/receive side QP restoration.

FIGS. 8 and 9 illustrate how the active/send side director and passive/receive side director interact while restoring a fabric resource, i.e. a QP. The connection manager is configured to establish, maintain and release QP connections for existing statically allocated QPs created during system initialization and new dynamic connections. Using an active/passive model that utilizes a set of connection manager specific packets for the protocol, the director on one side of the QP will initiate the connection request, while the director of the other side will respond to these requests. From start IDLE 800, the active/send side probes the logical paths and if a QP path is down as determined at 802, then the active/send side sends a connection request to the passive/receive side as indicated at 804. From start IDLE 900, in response to receiving the connection request from the active/send side as determined at 902, the passive/receive side will process the connection request as indicated at 904. If the passive/receive side QP state has transitioned from ERR to RTS as determined at 906 then a connection reply is sent to the QP active/send side target as indicated at 908. Otherwise a timeout occurs as indicated at 914. With reference to the active/send side, if the connection reply is received from the passive/receive side as determined at 806 the connection reply is processed as indicated at 808. Otherwise a timeout results as indicated at 810. If the active/send side QP state has transitioned from ERR to RTS as determined at 812 then an RTU packet is sent to the passive/receive side as indicated at 814. Otherwise a timeout results as indicated at 810. With reference again to the passive/receive side, if the RTU packet is received as determined at 910 then the resource is connected as indicated at 912. With reference again to the active/send side, the resource is tested with a test send operation using the QP as indicated at 816 and if the resource is ready as determined at 818 then the logical path is enabled as indicated at 820 and the connection context is put into a connected state as indicated at 822. If the resource is not ready then an online error is indicated at 824.

Figure 10:
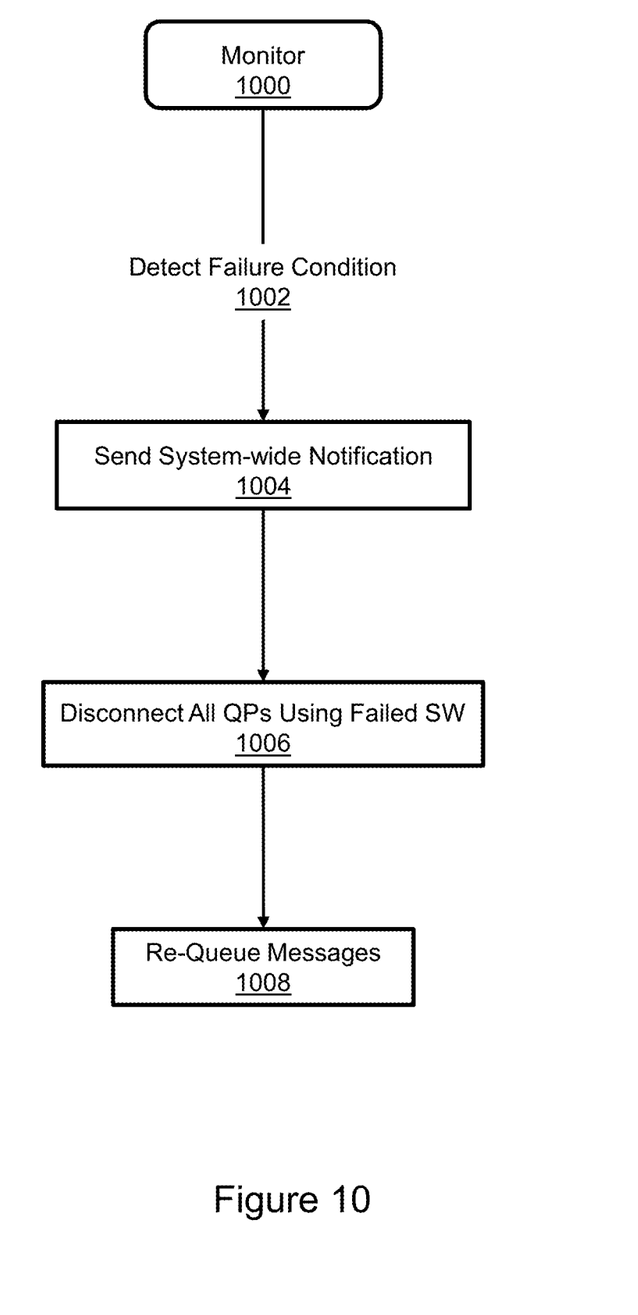
FIG. 10 illustrates system-wide aspects of automatically responding to a failure of a link between directors.

FIG. 10 illustrates system-wide aspects for automatically responding to a failure of a point-to-point link associated with a QP. The path managers continuously monitor link state and QP transport state as indicated at 1000. Following detection of a failure condition at 1002, a system-wide failure notification is sent as indicated at 1004. More particularly, every director in the data storage system receives a message which identifies the failed switch. In response, each director disables all QPs using the failed switch as indicated at 1006. For example, if switch 0 is indicated to have failed then messages are no longer placed into transmit queues of QPs associated with switch 0. Instead, all messages are directed to switch 1 by using QPs associated with switch 1. Messages that were already enqueued in transmit queues associated with switch 0 when the failure condition was detected are removed from those transmit queues and re-enqueued in transmit queues associated with switch 1 as indicated at 1008. Although the queues associated with failed switch 0 are isolated and emptied, the QP mappings associated with switch 0 are maintained and the corresponding cache address space allocated to transmit and receive queues remains allocated.

Figure 11:
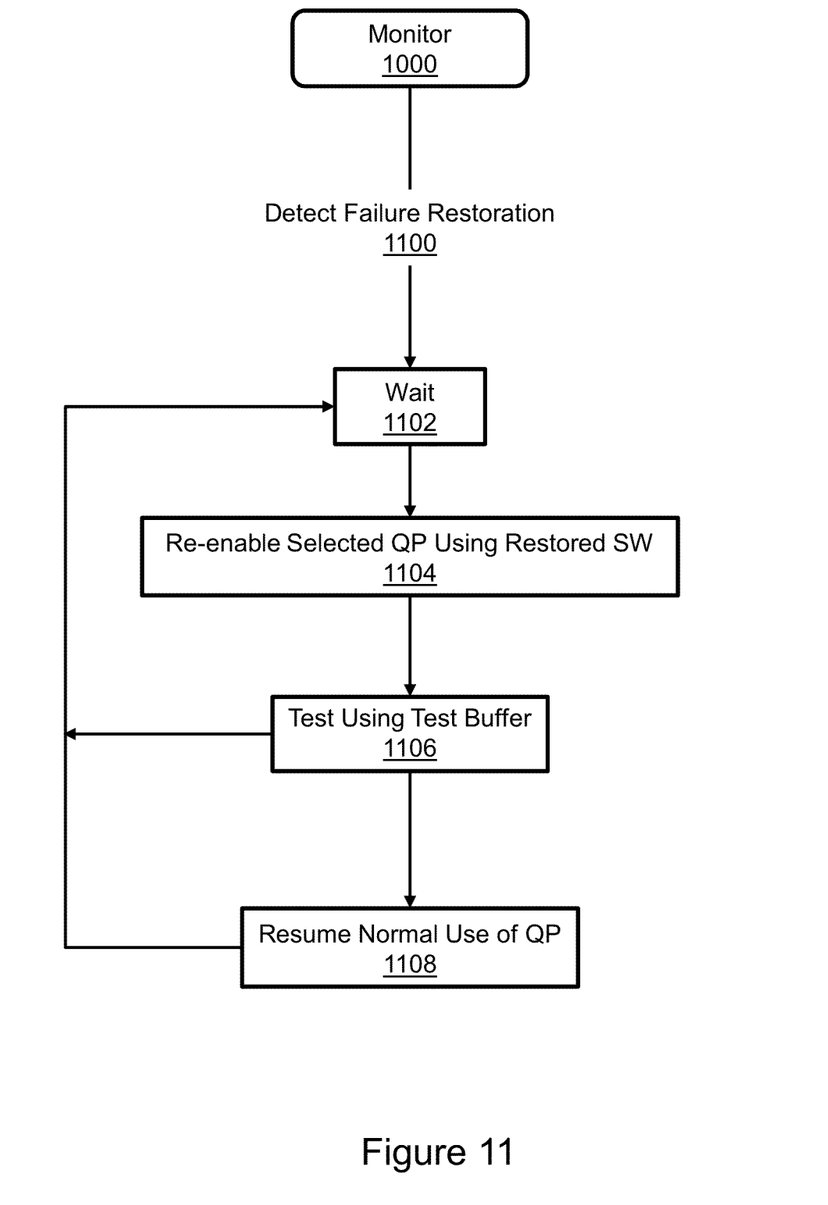
FIG. 11 illustrates further aspects of automatically responding to restoration of a failed link between directors.

FIG. 11 illustrates further aspects of automatically responding to restoration of a failed point-to-point link associated with a QP. As mentioned above, the path managers continuously monitor link state and QP transport state as indicated at 1000. Restoration from a failure condition as shown at 1100 may be indicated by a message from the restored switch or response of the switch or other device in an anticipated manner. Following detection of restoration from the failure condition a wait timer is started as indicated at 1102. For example, the wait timer may delay transmission of QP traffic via the restored switch for some predetermined number of minutes. Following expiration of the wait timer a test QP is selected and re-enabled as indicated at 1104. Operation of the re-enabled QP is then tested using a test buffer as indicated at 1106. For example, a test message may be placed in the QP transmit queue to determine whether an RDMA write can copy test data into a designated receive-side test buffer in the cache. If the test indicates satisfactory operation then normal usage of the QP is resumed as indicated at 1108 and another QP is selected and tested after a designated wait period (which may be of different duration than the initial wait period). Also, if the test indicates unsatisfactory operation then another QP is selected and tested after a designated wait period. Implementation of a wait period following failure restoration and resuming normal use of QPs in time-sequence may help to avoid repeated failures associated with many or all QPs associated with the failing switch.

Some aspects, features and implementations may comprise computer components and computer-implemented steps or processes that will be apparent to those skilled in the art. For example, it should be understood by one of skill in the art that the computer-implemented steps or processes may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
    a data storage system comprising:
        a plurality of data storage devices;
        a plurality of storage nodes configured to access the data storage devices and communicate with another device; and
        a first switch and a second switch, each of which interconnects each pair of the storage nodes via at least one point-to-point link such that there are at least two point-to-point links between each pair of storage nodes;
        wherein each storage node includes at least one memory component and is configured to utilize the point-to-point links to access memory components associated with other storage nodes of the plurality of storage nodes, and in response to detection of a failure condition to route all communications associated with accessing memory components associated with other storage nodes of the plurality of storage nodes through the second switch while maintaining mapping information associated with all of the point-to-point links through the first switch.

2. The apparatus of claim 1 wherein at least one queue pair is associated with each storage node pair and further comprising a channel adapter that maintains a pool of queue pairs including the mapping information.

3. The apparatus of claim 2 wherein each storage node is configured to disable a queue pair associated with a transport error.

4. The apparatus of claim 2 wherein each storage node is configured to disable a queue pair associated with an asynchronous event.

5. The apparatus of claim 2 wherein in response to detection of the failure condition a send side storage node of a storage node pair sends a connection request to a receive side storage node of the storage node pair, and the receive side storage node responds by sending a connection reply to the send side storage node.

6. The apparatus of claim 5 wherein the send side storage node and the receive side storage node exchange packets indicating readiness of the queue pair.

7. The apparatus of claim 6 wherein the send side storage node sends a test packet to the receive side storage node using the queue pair.

8. The apparatus of claim 2 wherein each storage node is configured to sequentially enable disabled queue pairs in response to the indication of failure restoration.

9. The apparatus of claim 2 wherein each storage node is configured to delay, in response to an indication of failure restoration, enabling queue pairs disabled due to a failure.

10. The apparatus of claim 1 wherein each storage node is configured to send a failure notification to other storage nodes in response to detection of a transport error or asynchronous event.

11. A method comprising:
    in a data storage system comprising a plurality of data storage devices, a plurality of storage nodes configured to access the data storage devices and communicate with another device, and a first switch and a second switch, each of which interconnects each pair of the storage nodes via at least one point-to-point link such that there are at least two point-to-point links between each pair of storage nodes:
    utilizing, by each storage node, the point-to-point links to access memory components associated with other storage nodes of the plurality of storage nodes; and
    in response to detection of a failure condition, routing all communications associated with accessing memory components associated with other storage nodes of the plurality of storage nodes through the second switch while maintaining mapping information associated with all of the point-to-point links through the first switch.

12. The method of claim 11 wherein at least one queue pair is associated with each storage node pair and comprising maintaining, by a channel adapter, a pool of queue pairs including the mapping information.

13. The method of claim 12 comprising disabling a queue pair associated with a transport error.

14. The method of claim 12 comprising disabling a queue pair associated with an asynchronous event.

15. The method of claim 12 comprising, in response to detection of the failure condition, a send side storage node of a storage node pair sending a connection request to a receive side storage node of the storage node pair, and the receive side storage node responding by sending a connection reply to the send side storage node.

16. The method of claim 15 comprising the send side storage node and the receive side storage node exchanging packets indicating readiness of the queue pair.

17. The method of claim 16 comprising the send side storage node sending a test packet to the receive side storage node using the queue pair.

18. The method of claim 12 comprising each storage node sequentially enabling disabled queue pairs in response to the indication of failure restoration.

19. The method of claim 12 comprising each storage node delaying, in response to an indication of failure restoration, enabling queue pairs disabled due to a failure.

20. The method of claim 11 comprising each storage node sending a failure notification to other storage nodes in response to detection of a transport error or asynchronous event.

* * * * *